(12) United States Patent
Hirayama

(10) Patent No.: US 6,383,564 B1
(45) Date of Patent: May 7, 2002

(54) METHOD FOR FORMING A POROUS COVERING LAYER ON A SUBSTRATE

(75) Inventor: Naka Hirayama, Shizuoka-ken (JP)

(73) Assignee: Nitto Kogyo Co., Ltd., Tokyo (JP)

( * ) Notice: Subject to any disclaimer, the term of this patent is extended or adjusted under 35 U.S.C. 154(b) by 0 days.

(21) Appl. No.: 09/471,400

(22) Filed: Dec. 23, 1999

(30) Foreign Application Priority Data

Dec. 24, 1998 (JP) .............................................. 10-367053

(51) Int. Cl.$^7$ .............................. C08J 9/34; B05D 5/00; B05D 3/02
(52) U.S. Cl. ...................... 427/245; 427/373; 427/385.5
(58) Field of Search .............................. 427/385.5, 245, 427/373

(56) References Cited

U.S. PATENT DOCUMENTS

| | | | |
|---|---|---|---|
| 3,574,150 A | * | 4/1971 | Jefferson et al. ............... 521/63 |
| 3,594,334 A | * | 7/1971 | Marlin ........................ 521/106 |
| 3,862,880 A | * | 1/1975 | Feldman ................... 428/319.9 |
| 4,022,941 A | * | 5/1977 | Prokai et al. ................. 427/358 |
| 4,483,894 A | * | 11/1984 | Porter et al. ................... 428/95 |
| 4,853,418 A | * | 8/1989 | Hanada et al. ............... 521/154 |
| 5,210,103 A | | 5/1993 | Valoppi et al. |
| 5,336,696 A | | 8/1994 | Ashida |
| 5,470,889 A | * | 11/1995 | Londrigan et al. .......... 521/125 |
| 5,768,668 A | * | 6/1998 | Shiraki et al. ............... 399/281 |
| 5,798,409 A | * | 8/1998 | Ho .............................. 524/506 |

FOREIGN PATENT DOCUMENTS

| | | |
|---|---|---|
| DE | 1 533 114 | 11/1978 |
| EP | 0 926 571 A2 | 6/1999 |
| JP | 5-285209 | * 11/1993 |

OTHER PUBLICATIONS

Derwent Abstract of JP 5–285209 (Nov. 1993).*
Boudreau, "How Silicone Surfactants Affect Polyurethane Foams", Modern Plastics, 44, pp. 133–135, 138, 143–144, 147, 234, 239–240 (Jan. 1967).*

* cited by examiner

Primary Examiner—Shrive P. Beck
Assistant Examiner—Michael Cleveland
(74) Attorney, Agent, or Firm—Armstrong, Westerman & Hattori, LLP

(57) ABSTRACT

A porous covering layer is formed on a substrate by applying a reaction mixture containing a polyol, an isocyanate compound, and a pore forming agent including a volatile silicone oil onto a surface of the substrate. The reaction mixture is subjected to a condition under which the polyol reacts with the isocyanate compound.

32 Claims, 1 Drawing Sheet

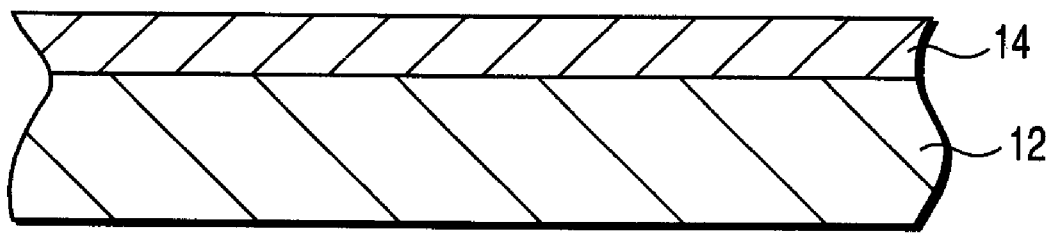
FIGURE

METHOD FOR FORMING A POROUS COVERING LAYER ON A SUBSTRATE

BACKGROUND OF THE INVENTION

The present invention relates to a method for forming a porous covering layer on a substrate.

Hitherto, a covering layer has been formed on various substrates for various reasons.

For example, a developing roller of, e.g., a copying machine or a laser printer has a polyurethane covering layer disposed on a conductive rubber layer formed on a metal core to prevent the surface of a photosensitive drum from being polluted by materials transferred from the conductive rubber layer.

Further a non-reflective covering layer is disposed on the inner surface of a camera or a lens-barrel.

However, conventional covering layers cannot keep their initial performance as they are worn away. Thus, they are unsatisfactory in that respect.

BRIEF SUMMARY OF THE INVENTION

Therefore, a main object of the present invention is to provide a method for forming, on a substrate, a covering layer which can substantially keep its initial performance even if it is worn away.

The inventors have conducted researches in an attempt to attain the above-mentioned object. As a result, the inventors have found that the object can be attained by reacting, on a surface of a substrate, a polyol with an isocyanate compound and optionally reactive silicone oil in the presence of a volatile silicone oil to produce a polyurethane covering layer on the substrate. The volatile silicone oil is volatilized during the reaction, and thus acts as a pore-forming agent to make the polyurethane covering layer porous.

Accordingly, the present invention provides a method for forming a porous covering layer on a substrate, comprising applying a reaction mixture containing a polyol, an isocyanate compound, and a pore-forming agent comprising a volatile silicone oil onto a surface of the substrate, and subjecting the reaction mixture to conditions under which the polyol reacts with the isocyanate compound.

The present invention also provides a method for forming a porous covering layer on a substrate, comprising applying a reaction mixture containing a polyol, a reactive silicone oil having active hydrogen, an isocyanate compound, and a pore-forming agent comprising a volatile silicone oil onto a surface of the substrate, and subjecting the reaction mixture to conditions under which the polyol and reactive silicone oil react with the isocyanate compound.

The polyol in the present invention is preferably a fluorine-containing polyol, and more preferably a copolymer polyol comprising a tetrafluoroethylene monomer unit as a major component.

The reactive silicon oil is preferably represented by the following formula (1) or (2):

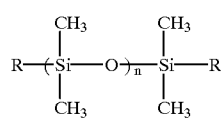
(1)

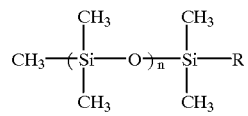
(2)

where each R represents $-C_3H_6OC_2H_4OH$ or $-C_3H_6OCH_2-C(CH_2OH)_2C_2H_5$ and n represents an integer of not more than about 20.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The single FIGURE is a sectional view for explaining the method for forming a porous covering layer of the present invention.

DETAILED DESCRIPTION OF THE INVENTION

Referring to the drawing, the present invention will be described in detail below.

FIGURE is a schematic sectional view for explaining the method for forming a porous covering layer of the present invention.

In the present invention, a covering layer 14 is formed by applying a reaction mixture containing a polyol, an isocyanate compound and a pore-forming agent comprising a volatile silicone oil onto a surface of a substrate 12, and subjecting this reaction mixture to a reaction condition under which the polyol reacts with the isocyanate compound. More specifically, the reaction mixture is placed under a temperature sufficient for the polyol and the isocyanate compound to react with each other to produce a polyurethane (hardening the polyol with the isocyanate compound). During this reaction, the volatile silicone oil is volatized, thereby making the polyurethane, the reaction product, microporous.

The polyol used in the present invention is preferably liquid at room temperature (20–30° C.), and various polyols may be used. Preferred examples of the polyol which can be used in the present invention include polyether polyol such as polyalkylene glycol including polyethylene glycol, polypropylene glycol, tetramethylene glycol and copolymers thereof.

However, a fluorine-containing polyol is especially preferred as the polyol used in the present invention. Preferred examples of the fluorine-containing polyol include a copolymer which is mainly made from trifluoroethylene monomer (a copolymer polyol having a trifluoroethylene monomer unit as a main component), and a copolymer which is mainly made from a tetrafluoroethylene monomer (a copolymer polyol comprising a tetrafluoroethylene monomer unit as a main component). These fluorine-containing polyols are commercially available under the tradename of useful (a copolymer polyol containing a tetrafluoroethylene unit as a major component) from Daikin Industries, Ltd.; and under the tradename of Lumiflon (a copolymer polyol containing a trifluoromonohaloethylene monomer as a major component) from Asahi Glass Industry Co., Ltd. A fluorine-containing polyol available under the tradename of Diffensa from Dainippon Ink & Chemicals, Inc. can also be used. Such fluorine-containing polyols are produced using, for example, a tetrafluoroethylene monomer as a major raw material, and contains hydroxymonocarboxylic ester of acrylic acid and/or glycol monoester of acrylic acid, which is copolymerized with the tetrafluoroethylene monomer, in a total amount of at least 2 moles. The above-mentioned monomer of acrylic ester gives these fluorine-containing copolymer polyols an OH component (OH of the carboxylic group in the case of the hydroxymonocarboxylic ester of acrylic acid, and OH of glycol that is not esterified in the case of the glycol monoester of acrylic acid). In the present invention, especially preferred is a copolymer polyol containing a tetrafluoroethylene monomer as a major component.

The isocyanate compound that is preferably used in the present invention may be diisocyanates such as diphenylmethane diisocyanate (MDI), tolylene diisocyanate (TDI), hexamethylene diisocyanate (HDI), as well as burette-modified form, isocyanurate-modified form and urethane-modified form thereof. Especially preferred isocyanate compounds are HDI, burette-modified for, isocyanurate-modified form, and urethane modified form thereof. As the molecular chain of isocyanate compounds is longer, the isocyanate compounds make it possible to produce a softer polyurethane covering layer 14.

The volatile silicone oil used in the present invention is a silicone oil that can be substantially completely volatilized, under the temperature condition for reacting the polyol and the isocyanate compound to produce the polyurethane covering layer, until the polyurethane-producing reaction (hardening of the polyol with the isocyanate compound) finishes. If the volatile silicone oil is not completely volatilized until the polyurethane-producing reaction of the polyol and the isocyanate compound substantially finishes, the silicon oil may remain in the produced polyurethane covering layer 14 to pollute the surface of members that the polyurethane covering layer 14 contacts. Most desirably, the volatile silicone oil has such a volatilizability that the oil is completely volatilized in 30 minutes or less when the oil is heated at 150° C. An especially preferred volatile silicone oil is a non-reactive silicone oil, which does not react with the polyol and the isocyanate compound used. Examples of the volatile silicone oil that can be preferably used include dimethylsilicone oil, cyclic silicone oil, and derivatives thereof such as alkyl modified form and polyether modified form thereof. A silicone oil having not more than 10 siloxane linkage units (—SiO—) is especially preferred. In order that the silicone oil is non-reactive, each of two remaining valences of Si in the respective SiO linkage units is filled with an organic group having no active hydrogen, such as an alkyl, aralkyl or aryl group. In the case of a straight chain silicone oil, both terminals thereof further have the above-mentioned non-reactive organic groups.

The polyol and the isocyanate compound are contained in the above-mentioned reaction mixture such that the ratio of the hydroxyl group equivalent of the polyol to the isocyanate group equivalent of the isocyanate compound is about 1:1. The isocyanate compound may be contained in a slightly excessive amount. The volatile silicone oil is contained preferably in an amount of 1 to 30% by weight of the polyol used, and more preferably in an amount of 5 to 20% by weight of the polyol used.

In order to form the covering layer 14, most preferably a reaction mixture containing the above-mentioned liquid polyol (in particular, liquid fluorine-containing polyol), the isocyanate compound and the pore-forming agent comprising the volatile silicone oil in a suitable solvent, optionally together with an electrical conductivity-imparting material which imparts electrical conductivity to the covering layer (such as carbon black, metal powder) and/or a filler (such as silica) is applied onto a surface of the substrate 12, which is optionally coated with a primer, by such a method as spray coating so as to form a thin film, and heating this thin film at such a temperature that the polyol and the isocyanate compound can be reacted, usually at a temperature of about 100° C. to about 200° C. so as to form the covering layer 14 in situ. In this case, the solvent used is a solvent having a volatilizability equal to or higher than that of the volatile silicone oil, and is, for example, butyl acetate. Generally, the coated thin film is hardened in 20 to 60 minutes.

If the volatile silicone oil is present in the mixture of the polyol and the isocyanate, the volatile silicone oil can exist, by the medium of the solvent present in the mixture, within the mixture of the polyol and the isocyanate immediately after this mixture is applied on the substrate 12 by spraying or the like. However, when the solvent is being gradually volatilized by heating, the volatile silicone oil which is insoluble in the mixture of the polyol and the isocyanate compound comes not to be dissolved in this mixture. As a result, it is considered that the volatile silicone oil is made into many microdroplets that are separated from each other in the mixture of the polyol and the isocyanate compound so that a so-called sea-island structure-is generated wherein the polyol and the isocyanate compound constitute a continuous phase (sea) and the volatile silicone oil constitute a discontinuous phase (islands). It is consider that while this sea-island structure from which the solvent has been volatilized is further heated, and the polyol and the isocyanate compound are reacted to produce polyurethane, the microdroplets of the volatile silicone oil made into the islands are volatilized to leave micropores so that the polyurethane covering layer 14 becomes a porous body.

The size of the respective pores of the porous covering layer 14 is preferably 3 $\mu$m or less in diameter, and more preferably from 0.1 to 1 $\mu$m in diameter. Such a size of the pores may be determined by the kind of the volatile silicon oil used. All of the volatile silicon oil exemplified above can give the pores having a size within such a range.

The porous covering layer 14 of the present invention preferably has a thickness of 30 $\mu$m or less. If the thickness is over 30 $\mu$m, the surface roughness of the covering layer trends to become large. Moreover, the porous covering layer 14 preferably has a thickness of 4 $\mu$m or more. If the thickness is below 4 $\mu$m, the covering layer cannot act as a barrier layer for preventing the pollutants from the substrate 12 from being transferred onto the surface. Moreover, the wear-resistance of the covering layer trends to decrease. Most preferably, the thickness of the covering layer 14 is from about 10 $\mu$m to about 20 $\mu$m.

The covering layer 14 formed by the present invention is composed of a porous body. Thus, its surface microscopically constitutes a rough surface due to the pores. This porous structure is substantially homogenous in the direction of the thickness of the covering layer 14. Therefore, even if the covering layer 14 is worn away, the surface having substantially the same nature as the initial surface makes its appearance. As a result, there is produced an advantage that its initial performance can be kept for a long time.

Additionally, in the case that the covering layer 14 of the present invention is applied onto an electrically conductive layer formed on a metal core of a developing roller, mirror image force acting on the toner is alleviated more than in conventional developing rollers whose covering layer has a smooth surface. Consequently, in the developing roller having the covering layer 14 of the present invention, the removal of remaining toner by means of a toner-supplying member is still more promoted so that new toner adheres easily onto the surface of the outermost layer (covering layer). Accordingly, a negative ghost generated due to the toner remaining on the surface of the developing roller is more suppressed in the developing roller having the covering layer of the present invention than in the conventional developing rollers having a smooth surface.

Since the covering layer 14 of the present invention is porous, it has elasticity and is easily deformed by external force. Therefore, the covering layer does not damage any member which contacts this layer.

Incidentally, the present inventor has found that when the covering layer of the present invention is applied to a developing roller, the microporous fluorine-containing polyurethane covering layer 12 formed by the reaction of the isocyanate compound and the preferred fluorine-containing polyol has intense negative chargeability due to the presence of fluorine. However, the inventor has then found that if a reactive silicone oil having active hydrogen is co-present during the polyurethane-producing reaction, a component having a siloxane linkage is incorporated in the polyurethane constituting the covering layer so that the triboelectric rank of the microporous fluorine-containing polyurethane covering layer can be changed or shifted. The reactive silicone oil involved in the reaction with the isocyanate compound together with the fluorine-containing polyol introduces its siloxane component into the polyurethane produced by the reaction of the polyol and the isocyanate compound. The siloxane or silicone itself has positive chargeability. As the content of the siloxane or silicone is larger, the positive chargeability of the resultant microporous fluorine-containing polyurethane covering layer 14 can be increased still more. That is, by changing the amount of the added reactive silicone oil, the triboelectric rank of the covering layer can be controlled.

The reactive silicone having active hydrogen is a silicone that can react with the isocyanate compound. Examples thereof include silicone oil having an amino group (primary and/or secondary amino group), silicone oil having a mercapto group, and silicone oil having a hydroxyl group (such as silicone oil having a carboxyl group, silicone oil having a phenolic OH group and silicone oil having an alcoholic OH group). These reactive silicone oils are commercially available as an amino-modified silicone oil, an mercapto-modified silicone oil, a carboxyl-modified silicone oil, phenol-modified silicone oil, and a carbinol-modified silicone oil. In the present invention, it is possible to use all of silicone oils having the reactive organic group at their one terminal, both terminals and/or their side chains. A silicone oil having hydrogen bonded to silicon in its silicone skeleton may also be preferably used.

More preferably, the reactive silicon oil can be represented by the following general formula (1) or (2):

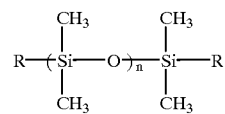

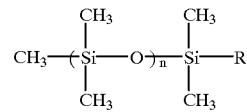

where each R represents —$C_3H_6OC_2H_4OH$ or —$C_3H_6OCH_2$—$C(CH_2OH)_2C_2H_5$ and n represents an integer of not less than about 20. An especially preferable reactive silicone oil is a silicone oil represented by the general formula (1) wherein each R is —$C_3H_6OC_2H_4OH$, and most preferably n is about 10. Such a reactive silicone oil is also commercially available.

In order to form a covering layer comprising the microporous fluorine-containing polyurethane into which this silicone is introduced, the above-mentioned reactive silicone oil having active hydrogen is added to the reaction mixture described above with reference to the microporous fluorine-containing polyurethane covering layer and then this mixture is applied to the substrate 12 as described above so as to conduct reaction under the same reaction conditions as noted above. Upon this reaction, the volatile silicone oil exhibits volatile behavior as described above. The reactive silicone oil, together with the fluorine-containing polyol (and the isocyanate compound), constitutes a continuous phase. By this reaction, it is possible to obtain a microporous fluorine-containing polyurethane covering layer having pores of which size is, in spite of the fact that the layer has the silicone incorporated therein, substantially the same as the above-mentioned microporous fluorine-containing polyurethane into which silicone is not introduced. In this case, the ratio of the hydroxyl group equivalent plus the active hydrogen equivalent to the isocyanate group equivalent is 1:1 in the reaction mixture. Alternatively, the isocyanate compound is present in a slightly excessive amount.

If the proportion of the reactive silicone oil is excessively larger with respect to the fluorine-containing polyol, the property of the silicone compound is intensely exhibited in the resultant covering layer itself, bringing about bad influences such as a decrease in the wear resistance of the covering layer. In general, it is preferable that the weight ratio of the fluorine-containing polyol to the reactive silicone oil is 1: not more than 3. If the proportion of the reactive silicone oil is changed within this range, the triboelectric rank of the covering layer can be changed from negative chargeability to positive chargeability.

Among commercially available reactive silicone oils, there are oils containing the volatile silicone oil that can be used in the present invention in an amount of 10% by weight or more. When a reactive silicone oil product containing such a large amount of the volatile silicone oil is used, it may be unnecessary to add separately the volatile silicone oil for forming the porous body (that is, the contained volatile silicone oil can be used as it is), or it may be possible to make the amount of the volatile silicone oil separately added small, depending on the amount of the reactive silicone oil used. Therefore, it is necessary that the amount of the volatile silicone oil in the reactive silicone oil product is beforehand determined by an analyzing means such as gel permeation chromatography (GPC).

The porous covering layer of the present invention can be applied to an image making member of a copying machine, a laser printer and the like, for example, the surface of a developing roller (such as the sleeve surface of a two-component developing roller, the sleeve surface of a magnetic one-component developing roller, and the surface of a non-magnetic one-component developing roller), the surface of a toner supplying roller, the surface of a drum cleaning roller and the surface of a developing blade; the surface of a paper transferring roller of a copying machine, various printers and a plotter; the inner surface of a camera or a lens-barrel, the inner surface of the lens-barrel of a telescope or binoculars, and the inner surface of the lens-barrel of optical measuring devices (a gloss meter, a luminescence meter and the like), as a non-reflective coating for optical devices. Besides, the present invention can be applied as an ornament coating for synthetic resin, rubber and synthetic rubber products.

The present invention will be described by way of Examples below. However, the present invention should not be limited these Examples.

EXAMPLE 1

A shaft core metal made of iron and having an outer diameter of 10 mm was coated with a conductive silicone rubber having a volume resistance of 106 Ω·cm and a JIS A hardness of 45° to produce a rubber coated roller having an outer diameter of 16 mm.

On the other hand, 300 parts by weight butyl acetate were added to a mixture of 100 parts by weight of a fluorine-containing polyol (Zeful made by Daikin Industries. Ltd.) and 5 parts by weight of conductive carbon black (made by Cabbot Company), and the resultant mixture was dispersed with a dispersing machine. To this dispersion-was added 5 parts by weight of a volatile silicone oil (KF 96L made by Shin-Etsu Chemical Co., Ltd.) and the resultant mixture was stirred to prepare a main agent. This main agent was blended with urethane-modified hexamethylene diisocyanate as a hardening agent (Dulanate made by Asahi Chemical Industry Co., Ltd.) such that the ratio of the hydroxyl group equivalent in the main agent to the isocyanate group equivalent in the hardening agent was 1, so as to prepare a coating material A. This coating material A was spray-coated on the above-mentioned rubber coated roller to have a thickness of 10 μm. The coated material was dried in air and heated at 160° C. for 40 minutes to form a desired microporous covering layer. The surface roughness Rz in the circumferential direction of this covering layer was 4 μm.

Comparative Example

A developing roller having a nonporous (dense) covering layer was prepared in the same manner as in Example 1 except that the volatile silicone oil was not added. The surface roughness Rz in the circumferential direction of this covering layer was 4 μm.

<Negative Ghost Test>

In order to evaluate whether or not the performance of the developing roller prepared in Example 1 had superiority to that of the developing roller prepared in Comparative Example, the respective developing rollers prepared in Comparative Example 1 and Comparative Example were installed into a laser beam printer (DP-560) (made by Mita Industrial Co., Ltd.) using positively charged toner. A predetermined test chart having black solid portions were printed to examine whether or not a ghost of characters was generated in the black solid portions of the paper after printing many times. The used test chart was a piece of paper having an A4 size, and had a character area having many printed character lines and a picture area where pictures of black squares were printed below the character area. At both sides of the chart, band-like black solid portions, longer than was wide, were printed. The solid portions crossed all of the character lines in the character area and extended to the picture area. The picture area was present between the two black solid portions.

As a result, any negative ghost was not generated in the developing roller of Example 1, but a negative ghost was generated in the developing roller of Comparative Example. Therefore, it was demonstrated that the porous covering layer of the present invention had an effect to prevent the generation of negative ghost.

EXAMPLE 2

A coating material B was prepared in the same manner as in Example 1 except that 50 parts by weight of a carbinol-modified reactive silicone oil (X-22–160 AS made by Shin-Etsu Chemical Co., Ltd.: a silicone oil represented by the general formula (1) wherein each R represents —$C_3H_6OC_2H_4OH$ and n is about 10) were added to the main agent and that the ratio of the volatile silicone oil to the total amount of the fluorine- containing polyol and the reactive silicone oil was adjusted to be equal to the ratio of the volatile silicone oil to the fluorine-containing polyol in the main agent of Example 1. This coating material B was used to form a microporous covering layer on the rubber coated roller prepared in Example 1.

The developing rollers prepared in Example 2 and Comparative Example were installed into an imaging unit for a laser printer (DP-560) (made by Mita Industrial Co., Ltd.). In this way, they were set to the body of the printer, and printing was performed on 3000 pieces of paper.

Consequently, the developing roller made in Example 2 did not cause pollution of the drum surface of a photosensitive body of the developing device used, and neither caused any filming on the roller itself nor the photosensitive drum. An image having the same quality as an initial image could be kept after the printing on the 3000 pieces of paper. On the other hand, the developing roller made in Comparative Example caused filming of toner on the roller itself and the photosensitive drum. Thus, an initial quality was could not be kept.

As described above, according to the present invention there is provided a method which can form, on a substrate, a covering layer making it possible to keep its initial performance even if it is worn away.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method for forming a porous covering layer on a substrate comprising: applying a reaction mixture, which consists of a polyol, an isocyanate compound, a pore forming agent consisting of a volatile silicone oil, optionally an electrical conductivity-imparting material, and optionally a filler, in a solvent for the polyol, the isocyanate and the volatile silicone oil, onto a surface of the substrate; and subjecting the reaction mixture to a reaction condition under which the polyol reacts with the isocyanate compound, thereby forming the covering layer and volatilizing the silicone oil to leave micropores in the covering layer.

2. The method according to claim 1, wherein the polyol is a fluorine-containing polyol.

3. The method according to claim 2, wherein the fluorine-containing polyol is a copolymer polyol comprising a tetrafluoroethylene monomer unit.

4. The method according to claim 1, wherein the polyol and the isocyanate compound are present in an amount sufficient that they react with each other to produce a polyurethane.

5. The method according to claim 4, wherein the weight ratio of the volatile silicone oil to the polyol is 0.01 to 0.3

6. The method according to claim 1, wherein the reaction condition includes temperatures from about 100° C. to about 200° C.

7. The method according to claim 1, wherein the micropores have a pore size of 3 μm or less.

8. The method according to claim 7 wherein the micropores have a pore size of 0.1 to 1 μm.

9. The method according to claim 1, wherein the volatile silicone oil has a volatilizability such that the oil is completely volatilized in 30 minutes or less when heated at 150° C.

10. The method according to claim 9, wherein the volatile silicone oil is a non-reactive silicone oil that does not react with the polyol and the isocyanate used.

11. The method according to claim 10, wherein the volatile silicone oil is selected the from the group consisting of a dimethylsilicone oil, a cyclic silicone oil, and an alkyl or polyether modified form thereof.

12. The method according to claim 10, wherein the volatile silicone oil has not more than 10 siloxane linkage units.

13. The method according to claim 1, wherein the covering layer has a thickness of 4 μm to 30 μm.

14. The method according to claim 13, wherein the covering layer has a thickness of 10 μm to 20 μm.

15. The method according to claim 1, wherein the reaction mixture is applied onto the surface of the substrate by spray coating.

16. A method for forming a porous covering layer on a substrate comprising applying a reaction mixture, which consists of a polyol, a reactive silicone oil having active hydrogen, an isocyanate compound, a pore forming agent consisting of a volatile silicone oil, optionally an electrical conductivity-imparting material, and optionally a filler, in a solvent for the polyol, the isocyanate and the volatile silicone oil, onto a surface of the substrate, and subjecting the reaction mixture to a reaction condition under which the polyol and the reactive silicone oil react with the isocyanate compound, thereby forming the covering layer and volatilizing the volatile silicone oil to leave micropores in the covering layer.

17. The method according to claim 16, wherein the polyol is a fluorine-containing polyol.

18. The method according to claims 17, wherein the fluorine-containing polyol is a copolymer polyol comprising a tetrafluoroethylene monomer unit.

19. The method according to claim 16, wherein the polyol and the isocyanate compound are present in an amount sufficient that they react with each other to produce a polyurethane.

20. The method according to claim 19, wherein the weight ratio of the volatile silicone oil to the polyol is 0.01 to 0.3.

21. The method according to claim 20, wherein the weight ratio of the reactive silicone oil to the polyol is 3 or less.

22. The method according to claim 16, wherein the reaction condition includes temperatures from about 100° C. to about 200° C.

23. The method according to claim 16, wherein the reactive silicone oil is represented by the following general formula (1) or (2):

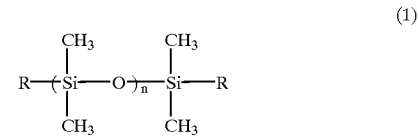

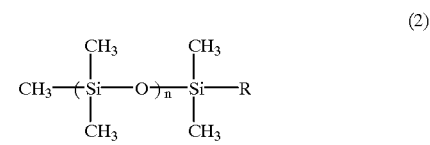

where each R represents —$C_3H_6OC_2H_4OH$ or —$C_3H_6OCH_2$—$C(CH_2OH)_2C_2H_5$ and n represents an integer of not less than about 20.

24. The method according to claim 16, wherein the micropores have a pore size of 3 μm or less.

25. The method according to claim 24, wherein the micropores have a pore size of 0.1 to 1 μm.

26. The method according to claim 16, wherein the volatile silicone oil has a volatilizability such that the oil is completely volatilized in 30 minutes or less when heated at 150° C.

27. The method according to claim 26, wherein the volatile silicone oil is a non-reactive silicone oil that does not react with the polyol and the isocyanate used.

28. The method according to claim 27, wherein the volatile silicone oil is selected from the group consisting of a dimethylsilicone oil, a cyclic silicone oil, and an alkyl or polyether modified form thereof.

29. The method according to claim 27, wherein the volatile silicone oil has not more than 10 siloxane linkage units.

30. The method according to claim 16, wherein the covering layer has a thickness of 4 μm to 30 cm.

31. The method according to claim 30, wherein the covering layer has a thickness of 10 μm to 20 μm.

32. The method according to claim 16, wherein the reaction mixture is applied onto the surface of the substrate by spray coating.

* * * * *